US009141108B2

(12) United States Patent
Allen et al.

(10) Patent No.: US 9,141,108 B2
(45) Date of Patent: Sep. 22, 2015

(54) UNMANNED VEHICLE CONTROLLER WITH INTERCHANGEABLE FUNCTION BRIDGE MODULES

(71) Applicant: Mason Electric Co., Sylmar, CA (US)

(72) Inventors: Kevin Allen, Canyon Country, CA (US); Terry Peterson, Eagle Rock, CA (US); Joe C. Fielding, Moorpark, CA (US); Raymond Francisco, Tujunga, CA (US); André Abelian, Glendale, CA (US); Charlotte Ann Marelius, Granada Hills, CA (US); David Daniel Drobnis, Mar Vista, CA (US); John Ronquillo, Los Angeles, CA (US)

(73) Assignee: Mason Electric Company, Sylmar, CA (US)

( * ) Notice: Subject to any disclaimer, the term of this patent is extended or adjusted under 35 U.S.C. 154(b) by 0 days.

(21) Appl. No.: 14/062,753

(22) Filed: Oct. 24, 2013

(65) Prior Publication Data

US 2014/0188308 A1 Jul. 3, 2014

Related U.S. Application Data

(63) Continuation of application No. 12/854,143, filed on Aug. 10, 2010, now abandoned.

(60) Provisional application No. 61/232,762, filed on Aug. 10, 2009.

(51) Int. Cl.
G05D 1/00 (2006.01)

(52) U.S. Cl.
CPC .................................... *G05D 1/0016* (2013.01)

(58) Field of Classification Search
USPC .................. 701/2; 341/20, 22, 176; 244/190; 463/36, 37, 39
See application file for complete search history.

(56) References Cited

U.S. PATENT DOCUMENTS

| 5,451,053 | A | 9/1995 | Garrido |
| 6,530,838 | B2 | 3/2003 | Ha et al. |
| 6,703,962 | B1 | 3/2004 | Marics et al. |
| 6,752,719 | B2 | 6/2004 | Himoto et al. |
| 6,773,349 | B2 | 8/2004 | Hussaini et al. |

(Continued)

FOREIGN PATENT DOCUMENTS

| EP | 0096339 | 12/1983 |
| EP | 0218019 | 4/1987 |

(Continued)

OTHER PUBLICATIONS

International Search Report and Written Opinion for Application No. PCT/US2010/045098; Mailed: Sep. 23, 2010; 12 pages.

(Continued)

*Primary Examiner* — Jeremy R Severson
(74) *Attorney, Agent, or Firm* — Perkins Coie LLP

(57) ABSTRACT

Handheld, unmanned vehicle controllers including interchangeable function bridge modules attached to the grip handles of the controllers are described herein. Interchangeable function bridge modules can include, but are not limited to, a display screen module, a pushbutton module, and a keyboard module. An operator may quickly and easily swap modules, using different modules to perform various tasks.

7 Claims, 10 Drawing Sheets

(56) References Cited

U.S. PATENT DOCUMENTS

| | | | |
|---|---|---|---|
| 6,811,491 | B1 | 11/2004 | Levenberg et al. |
| 7,471,216 | B2 | 12/2008 | Chen et al. |
| 8,290,646 | B2 * | 10/2012 | Ecton et al. ............ 701/19 |
| 8,373,391 | B1 * | 2/2013 | Allen et al. ............ 320/115 |
| 9,005,025 | B2 * | 4/2015 | Joynes et al. ............ 463/37 |
| 2002/0155890 | A1 | 10/2002 | Ha et al. |
| 2004/0023719 | A1 | 2/2004 | Hussaini et al. |
| 2004/0224763 | A1 | 11/2004 | Lum et al. |
| 2005/0248966 | A1 | 11/2005 | Matsui |
| 2005/0259070 | A1 | 11/2005 | Hull et al. |
| 2005/0288098 | A1 | 12/2005 | Tse |
| 2006/0262000 | A1 | 11/2006 | Strong |
| 2006/0279039 | A1 | 12/2006 | Krieger et al. |
| 2008/0153593 | A1 | 6/2008 | Ikeda et al. |
| 2008/0311992 | A1 | 12/2008 | Young et al. |

FOREIGN PATENT DOCUMENTS

| | | |
|---|---|---|
| EP | 0393843 | 10/1990 |
| FR | 1568139 | 5/1969 |
| GB | 2042417 | 9/1980 |
| GB | 2338910 | 1/2000 |

OTHER PUBLICATIONS

Terrence W. Fong et al., "Novel Interfaces for Remote Driving: Gesture, Haptic and PDA", Proceedings of SPIE—International Society for Optical Engineering, SPIE International Society for Optical Engineering, US, vol. 4195-33, Nov. 1, 2000, pp. 300-311, XP009118241, ISSN: 0277-786X p. 307-309; figures 11-13.

European Search Report for Application No. 10808667.9, Mailed Jan. 3, 2013, 10 pages.

* cited by examiner

UNMANNED VEHICLE CONTROLLER WITH INTERCHANGEABLE FUNCTION BRIDGE MODULES

CROSS REFERENCE TO RELATED APPLICATIONS

This application is a continuation of U.S. patent application Ser. No. 12/854,143, filed Aug. 10, 2010, which is a U.S. Non-Provisional Patent Application that hereby claims priority to U.S. Provisional Patent Application No. 61/232,762, titled Unmanned Vehicle Controller With Interchangeable Function Bridge Modules, filed Aug. 10, 2009, all of which are incorporated herein in their entirety by reference thereto.

TECHNICAL FIELD

The following disclosure relates generally to vehicle controllers and, more particularly, to unmanned vehicle controllers with interchangeable modules.

BACKGROUND

Unmanned vehicles, such as unmanned ground, aerial, and underwater vehicles, drones, and other vehicles, may be controlled by a human operator from a remote location using a variety of types of controllers. For example, an operator may sit at a control station equipped with one or more computers and control devices. As another example, an operator may use a handheld controller to control an unmanned vehicle.

Handheld unmanned vehicle controllers may include one or more controls, such as pushbuttons, switches, and other controls. Current handheld controllers are limited, however, in the number and quality of functions that may be performed and the accessibility and utility of vehicle data. Some handheld controllers include a display screen attached to the top of the controller, such as cantilevered from the top of the controller. Such a design is not well-balanced, and stresses the controller grip. Moreover, the display screen is not within the field of view of other controls on the controller, requiring an operator to move his eyes and/or head to switch between viewing the display screen and operating the controls.

SUMMARY

Handheld unmanned vehicle controllers include an interchangeable function bridge module attached to the grip handles of the controller. The placement of the function bridge module between the grip handles causes the grips' center of mass to be distributed between a controller operator's hands during use. The function bridge is within the field of view of one or more other control areas of the controller, allowing the operator to utilize data faster and with greater accuracy. Interchangeable function bridge modules can include, but are not limited to, a display screen module, a pushbutton module, and a keyboard module. An operator may quickly and easily swap modules, using different modules to perform various tasks.

DETAILED DESCRIPTION

The present disclosure describes handheld unmanned vehicle controllers, such as harms way unmanned vehicle controllers, that include an interchangeable function bridge attached to grip handles of the controller. Among other benefits, the placement of the function bridge between the grip handles causes the grips' center of mass to be distributed between a controller operator's hands during use. Such distribution of the center of mass minimizes stress on the operator's hands and wrists. In addition, the function bridge design keeps the grip small and lightweight, reduces vulnerability to vibration and shock, and is easily stowable in a standard military-issue pack or pouch.

The function bridge is within the field of view of one or more other control areas of the controller. Among other benefits, this unified field of view allows the controller operator to view the function bridge and the other controls simultaneously or in turn, without moving his eyes or head. In addition to reducing operator eye strain, this unified field of view allows the operator to utilize data faster and with greater accuracy, as compared to a controller in which the operator must look away from a display screen in order to operate the controls.

Embodiments of interchangeable function bridge modules can include, but are not limited to, a display screen module, a pushbutton module, and a keyboard module. The function bridge module can be permanently or removeably attached to the controller. In some embodiments, the function bridge module can include a tray component permanently or removeably attached to the controller and an interchangeable cover component removeably mounted to the tray component. Among other benefits, the controllers described herein allow a controller operator to quickly and easily swap entire modules or portions of modules, using different modules to perform various tasks. For example, different function bridge modules may be used for text entry, orienteering, switched commands, and/or other tasks. The controller described herein also makes it easy to upgrade each module as the technology embodied in that module advances. For example, a first display screen module may be easily replaced with a second display screen module having improved OLED (i.e., organic light emitting diode) technology.

Figure 1:
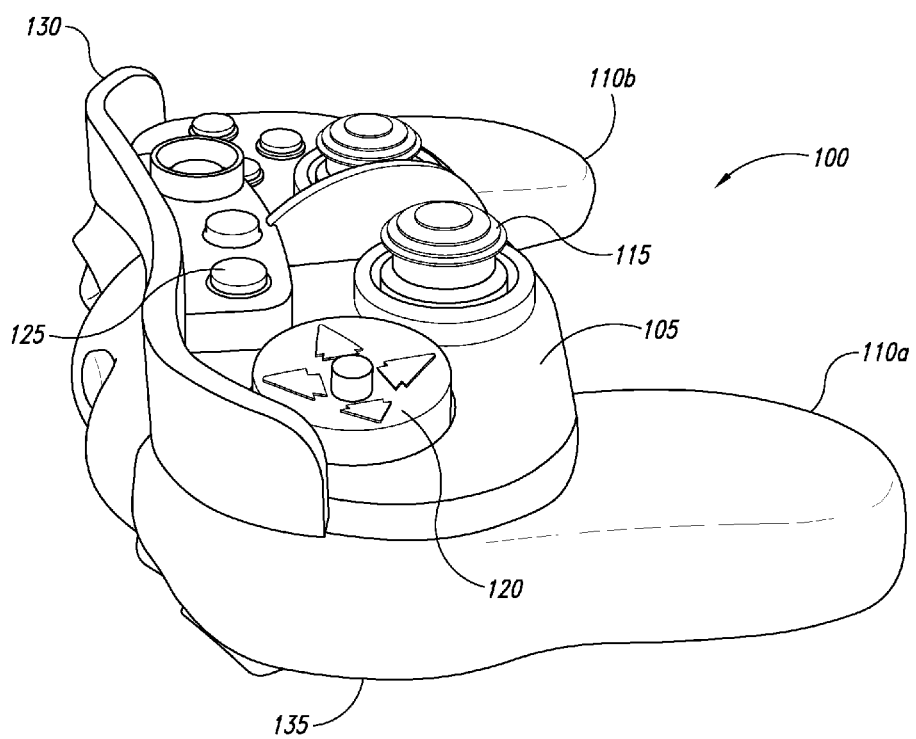
FIG. 1 is a side isometric view of an unmanned vehicle controller.

FIG. 1 is a side isometric view of an unmanned vehicle controller 100 configured in accordance with an embodiment of the disclosure. In one embodiment, the controller 100 can be a harms way unmanned vehicle controller. The controller 100 includes a control area 105 that includes at least one of a variety of control types including, but not limited to, a 2-axis cursor control 115, a toggle-action switch 120, and a pushbutton switch 125. In some embodiments, the 2-axis cursor control 115 is thumb-actuated and operates according to Hall effect technology. In some embodiments, the toggle-action switch 120 has a center pushbutton, making the toggle-action switch a five-way switch. In addition, the toggle-action switch 120 can operate according to a high reliability membrane technology. The control area 105 can also include one or more clusters of pushbutton switches 125. For example, in some embodiments, the control area 105 includes a first cluster of pushbutton switches by a grip visor 130 and a second cluster of pushbutton switches opposite the toggle-action switch 120.

Figure 8:
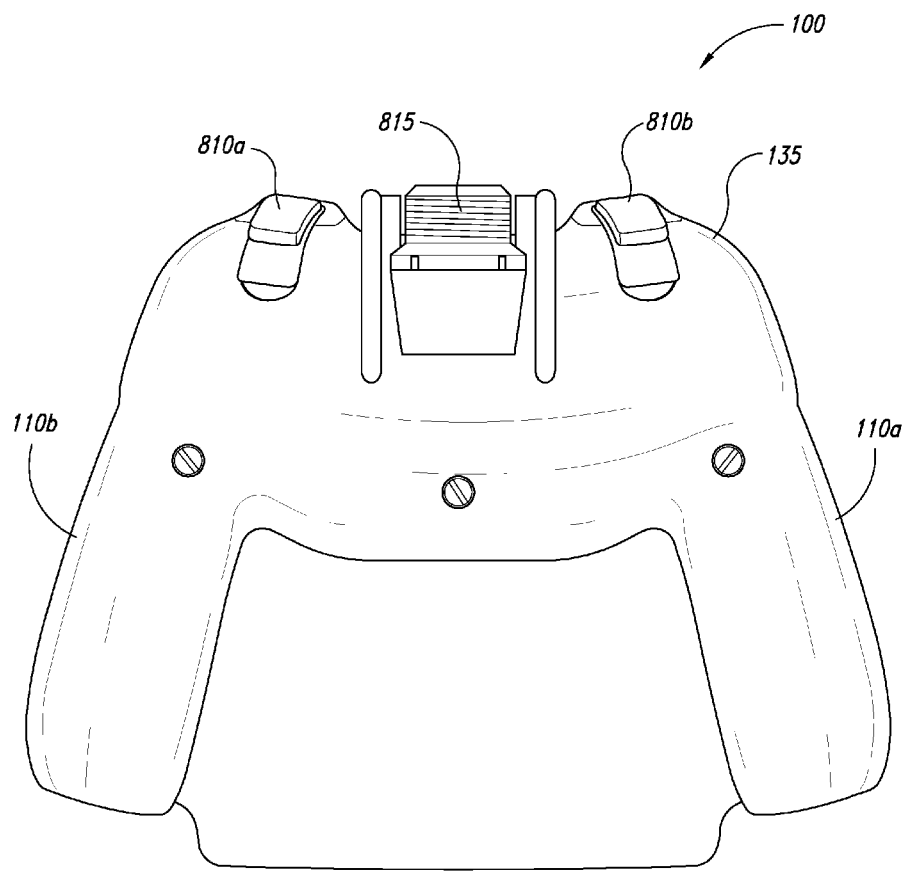
FIG. 8 is a bottom view of an unmanned vehicle controller having a function bridge.

In some embodiments, the controller 100 includes one or more switches on the bottom surface 135 of the controller. FIG. 8 is a bottom view of the controller 100 configured in accordance with an embodiment of the invention. For example, in some embodiments, the controller 100 includes a first switch 810a and a second switch 810b on the bottom surface 135. The switches 810a and 810b can include flip-guarded pushbuttons or triggers, rockers or Hall effect rockers, and/or other switches.

Returning to FIG. 1, the controller 100 includes a first grip handle 110a and a second grip handle 110b. In some embodiments, the grip handles 110a and 110b are covered in a soft-touch overmoulding of black urethane. One skilled in the art will appreciate that the grip handles 110a and 110b can be covered in one or more alternative or additional materials, including plastics, composites, metals, and other materials. The materials that cover the grip handles 110a and 110b can be selected based on factors that include, but are not limited to, comfort, durability, and performance.

In some embodiments, the controller 100 includes a visor 130 that, among other benefits, protects against unintended switch actuation. In some embodiments, the visor 130 is covered in a soft-touch overmoulding of black urethane, identical or similar to that of the grip handles 110a and 110b. In some embodiments, the controller 100 includes one or more guards in addition to the visor 130 that further protect against unintended switch actuation. These guards can include a ring guard, a barrier guard, and other guards.

In some embodiments, the controller 100 is constructed from a ruggedized, die-cast aluminum. One skilled in the art will appreciate that the controller 100 can be constructed from one or more alternative or additional materials, such as plastics, composites, metals, and other materials. These materials may be selected based on factors that include, but are not limited to, weight, durability, and performance. In some embodiments, the controller 100 has a weight of 1 pound, 8 ounces, or approximately 1 pound, 8 ounces.

In the illustrated embodiment, the controller 100 is sealed to protect against environmental elements, such as sand, dust, and rain. In addition, the controller 100 is equipped to protect against electromagnetic interference (EMI).

In some embodiments, the controller 100 is wired, while in other embodiments the controller is wireless. In wired embodiments, the controller 100 can use any of a variety of well known wired interfaces, including a USB 2.0/RS422 interface. The wired interface is determined by the cable pin-out of the controller 100. FIG. 8 depicts a connector portion 815 to which a wire is connectable.

Figure 2:
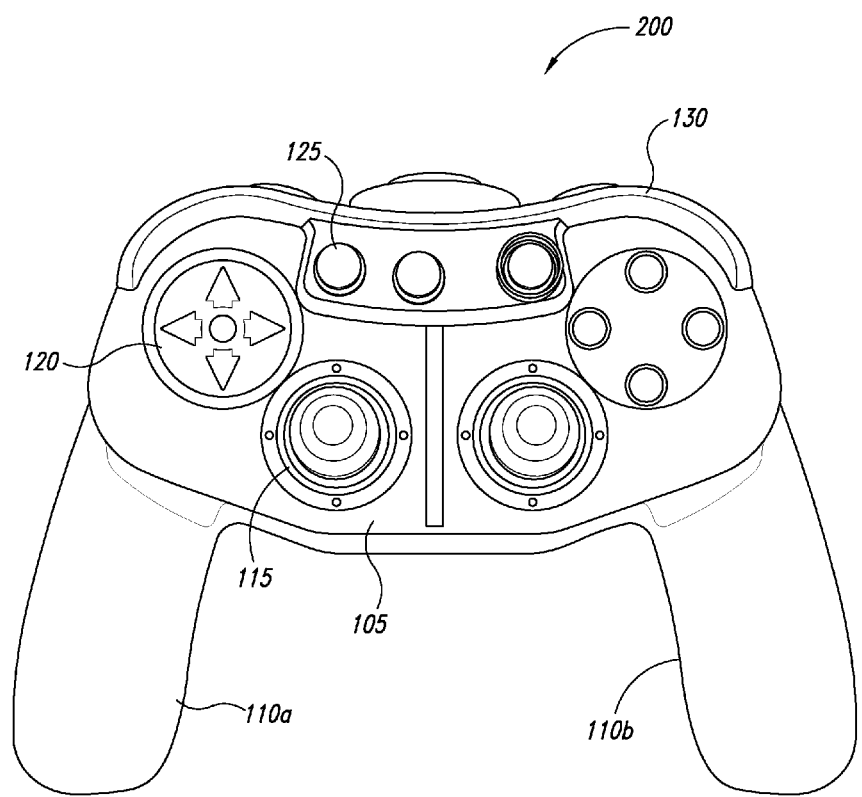
FIG. 2 is a top view of an unmanned vehicle controller.

FIG. 2 is a top view of an unmanned vehicle controller 200 configured in accordance with an embodiment of the disclosure. The controller 200 includes features similar to controller 100 depicted by FIG. 1, including a control area 105 that includes a variety of controls, including controls 115, 120, and 125. The controller 200 also includes grip handles 110a and 110b and a visor 130.

Figure 3:
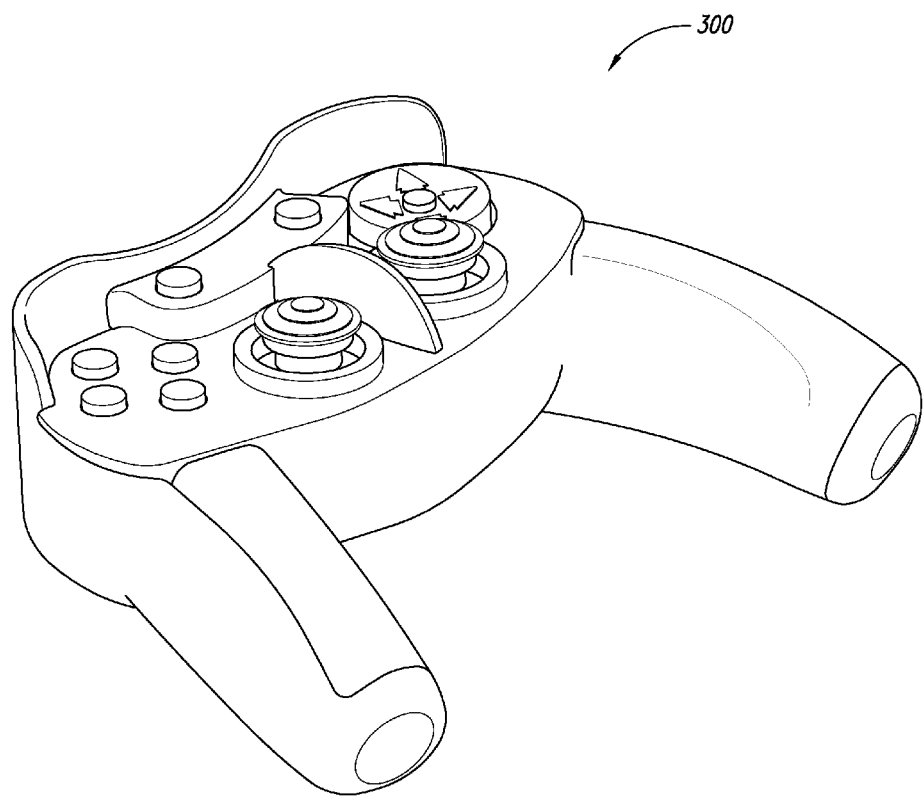
FIG. 3 is a side isometric view of a wireless unmanned vehicle controller.

FIG. 3 is a side isometric view of a wireless unmanned vehicle controller 300 configured in accordance with an embodiment of the disclosure. The wireless controller 300 includes many features similar to that of controllers 100 and 200, depicted by FIGS. 1 and 2, respectively. The wireless controller 300 can use any of a variety of well-known wireless transceivers, including a frequency-hopping 2.4 GHz band transceiver with an outdoor range of at least 50 meters. In some embodiments, the controller is powered using a flash charge (e.g., a 3-second flash charge); batteries are not required. The wireless controller 300 can remain charged for varying lengths of time, such as 1,000,000 duty cycles and/or three hours of continuous use run time. In some embodiments, the wireless controller 300 has a weight of 1 pound, 12 ounces, or approximately 1 pound, 12 ounces.

In accordance with embodiments of the disclosure, a function bridge module is attached to the grip handles of the controllers described herein. The function bridge module is attached to the controllers within the field of view of one or more other control areas, as described above. Interchangeable function bridge modules can include, but are not limited to, a display screen module, a pushbutton module, and a keyboard module.

Figure 4:
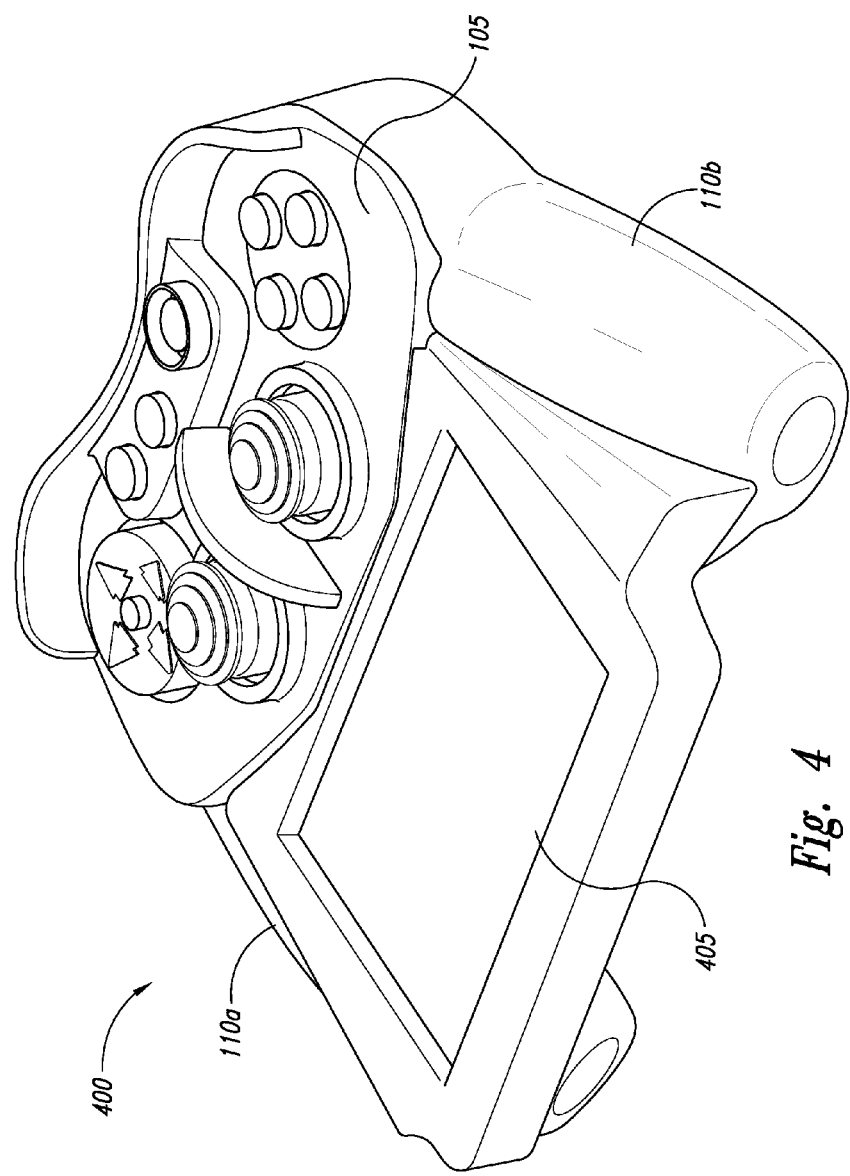
FIG. 4 is a side isometric view of an unmanned vehicle controller having a display screen module.

FIG. 4 is a side isometric view of an unmanned vehicle controller 400 having a function bridge module comprising a display screen module. The controller 400 includes many features similar to that of controllers 100, 200, and 300, depicted by FIGS. 1, 2, and 3, respectively. The controller 400 includes a display screen module 405 attached to the grip handles 110a and 110b. In some embodiments, the display screen module 405 is mounted to the grip handles via one or more fasteners, such as screws, snaps, connectors, or other mechanisms. In other embodiments, the display screen module 405 or a portion of the display screen module 405 is integral to the grip handles 110a and 110b and/or the control area 105.

The display screen module 405 or a portion of the display screen module 405 can be transmitting data to the grip handles 110a and 110b and/or the control area 105 via various device interface mechanisms known in the art including, but not limited to, USB. The display screen module 405 provides a controller operator with visual feedback of an unmanned vehicle and associated data, without requiring the use of a heads-up eyepiece or a larger laptop display. In some embodiments, the controller 400 with the display screen module 405 has a weight of 1 pound, 14 ounces, or approximately 1 pound, 14 ounces.

Unlike controllers that attach a display screen module to the top of a controller, such as cantilevered from the top of the controller, the placement of the display screen module 405 between the grip handles 110a and 110b reduces the risk of damage to the display screen module 405, both during use and replacement of the display screen module 405. In addition, the placement of the display screen module 405 acts to strengthen the controller grip, whereas a cantilevered display screen module stresses the grip.

The display screen module 405 may be configured according to any of a variety of well known OLED technologies. In some embodiments, the display screen module 405 is a 4.3" AMOLED (i.e., active-matrix organic light-emitting diode) screen with a resolution of 480×272 pixels, or approximate. In such embodiments, the display screen module 405 is a full-color display having a brightness of approximately 200 $Cd/m^2$ and a viewing angle of approximately 180 degrees. In some embodiments, the display screen module 405 is a touchscreen display operable by an operator with bare or gloved hands.

In some embodiments, the display screen module 405 is removable, such as for replacement by another function bridge module. In some embodiments, the display screen module 405 is detachable by removing or releasing the fasteners that attach the display screen module 405 to the grip handles 110a and 110b and/or control area 105. In other embodiments, the display screen module 405 slides in and out of a casing that engages with the display screen module 405 and other function bridge modules. For example, an operator can slide the display screen module 405 out of the casing, slide another function bridge module into the casing, and snap the new function bridge module securely into place.

Figure 5:
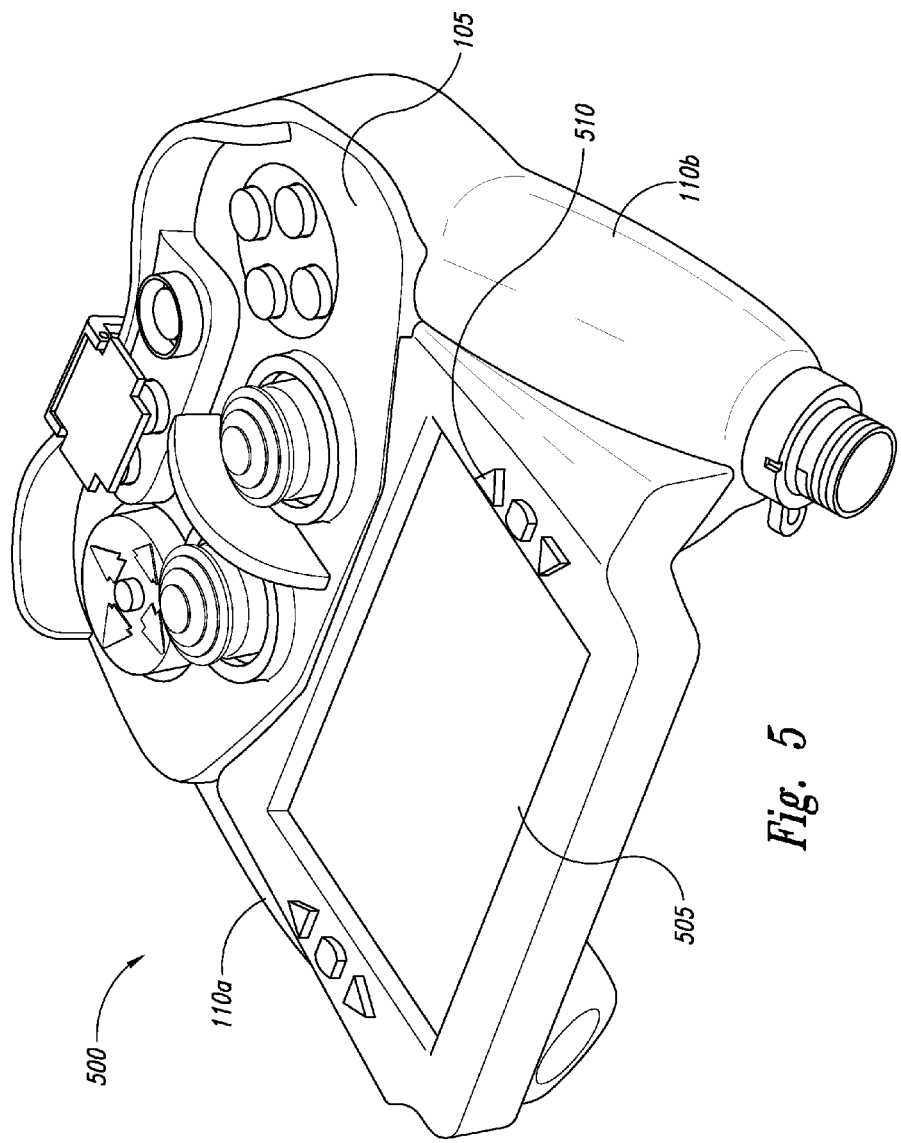
FIG. 5 is a side isometric view of an unmanned vehicle controller having an alternative display screen module.

FIG. 5 is a side isometric view of an unmanned vehicle controller 500 having a function bridge module comprising an alternative display screen module 505. The controller 500 includes many features similar to that of controllers 100, 200, and 300, depicted by FIGS. 1, 2, and 3, respectively. The controller 500 includes a display screen module 505 attached to the grip handles 110a and 110b. As with the display screen module 405 depicted by FIG. 4, the display screen module 505 can be mounted or integral to the grip handles 110a and 110b and/or the control area 105.

The display screen module 505 or a portion of the display screen module 505 can be transmitting data to the grip handles 110a and 110b and/or the control area 105 via various device interface mechanisms known in the art including, but not limited to, USB. The display screen module 505 includes one or more pushbuttons 510 that provide additional functionality to the display screen module 505. For example, the pushbuttons can be operable to move or scroll the display in various directions. One skilled in the art will appreciate that the pushbuttons 510 may provide alternative or additional functionality for use with the display screen module 505.

Figure 6:
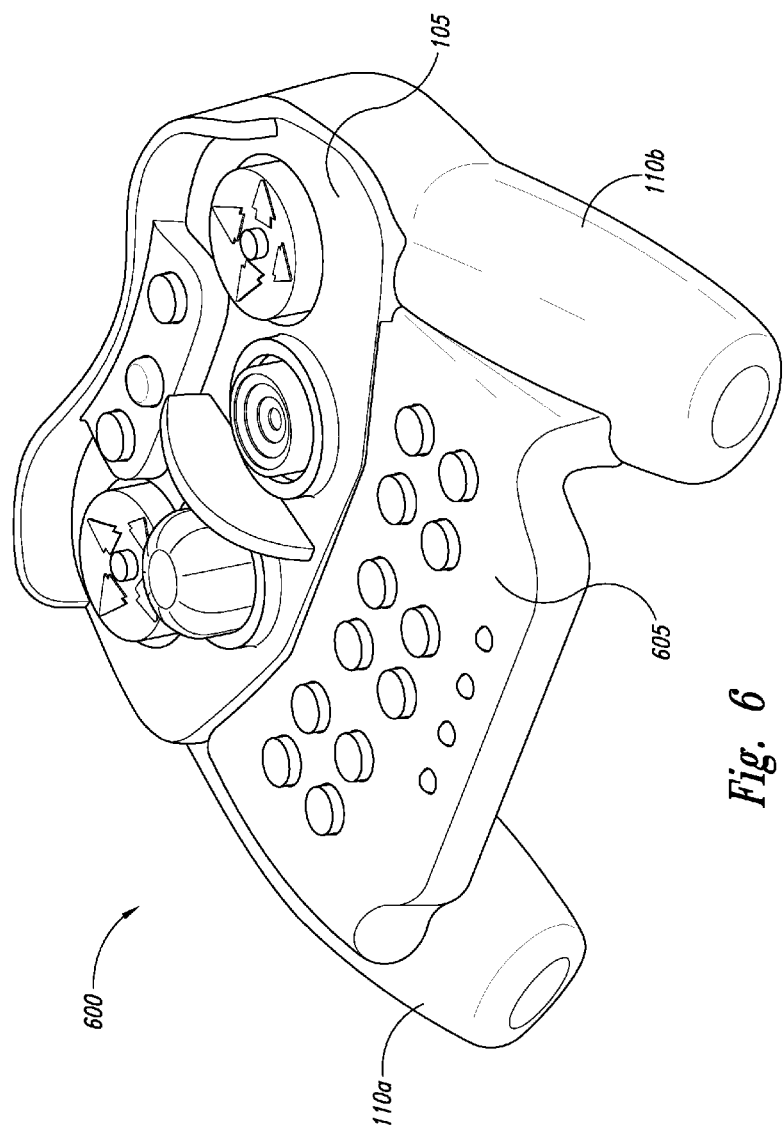
FIG. 6 is a side isometric view of an unmanned vehicle controller having a pushbutton module.

FIG. 6 is a side isometric view of an unmanned vehicle controller 600 having a function bridge module comprising a pushbutton module 605. The controller 600 includes many features similar to that of controllers 100, 200, and 300, depicted by FIGS. 1, 2, and 3, respectively. The controller 600 includes a pushbutton module 605 attached to the grip handles 110a and 110b. In some embodiments, the pushbutton module 605 is mounted to the grip handles via one or more fasteners, such as screws, snaps, connectors, or other mechanisms. In other embodiments, the pushbutton module 605 or a portion of the pushbutton module 605 is integral to the grip handles 110a and 110b and/or the control area 105.

The pushbutton module 605 or a portion of the pushbutton module 605 can be transmitting data to the grip handles 110a and 110b and/or the control area 105 via various device interface mechanisms known in the art including, but not limited to, USB. The pushbutton module 605 includes at least one of a variety of controls including, but not limited to, pushbuttons and five-way toggle-pushbutton switches. Each of the pushbuttons and/or switches may be operable to perform one or more control functions. In some embodiments, the pushbutton module 605 additionally includes a force transducer, a rotary encoder, an NVIS—(Night Vision Imaging System) compatible LED reading light for a controller faceplate, and/or LED system status annunciators. In some embodiments, the controller 600 with the pushbutton module 605 has a weight of 1 pound, 13 ounces, or approximately 1 pound, 13 ounces.

In certain embodiments, the pushbutton module 605 is removable, such as for replacement by another function bridge module. In some embodiments, the pushbutton module 605 is detachable by removing or releasing the fasteners that attach the pushbutton module 605 to the grip handles 110a and 110b and/or control area 105.

Figure 10:
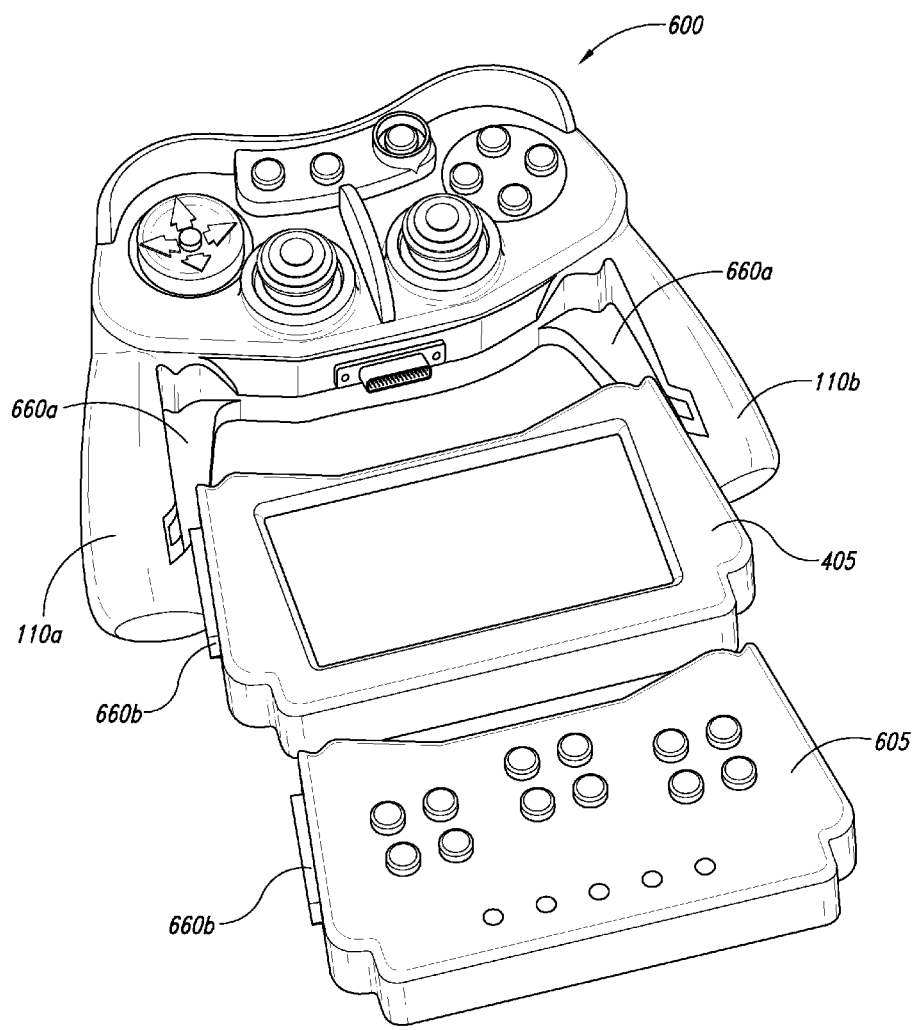
FIG. 10 is a top isometric view of an unmanned vehicle controller having two alternative, interchangeable function bridge modules configured for slideable interfacing.

In other embodiments, the pushbutton module 605 slides in and out of a casing 660a that engages with the pushbutton module 605 and other function bridge modules. FIG. 10 is a top isometric view of controller 600 configured in accordance with an embodiment of the invention. For example, an operator can slide the pushbutton module 605 out of the casing 660a, slide another function bridge module into the casing 660a, and snap the new function bridge module securely into place. The casing 660a corresponds to and interfaces with slideable interfaces 660b on the function bridge modules. In the illustrated embodiment, a display screen module 405 and a pushbutton module 605 each have a slideable interface 660b and can interchangeably be attached to the controller 600. In other embodiments, other types of modules, casing or slideable interfaces may be used.

Figure 7:
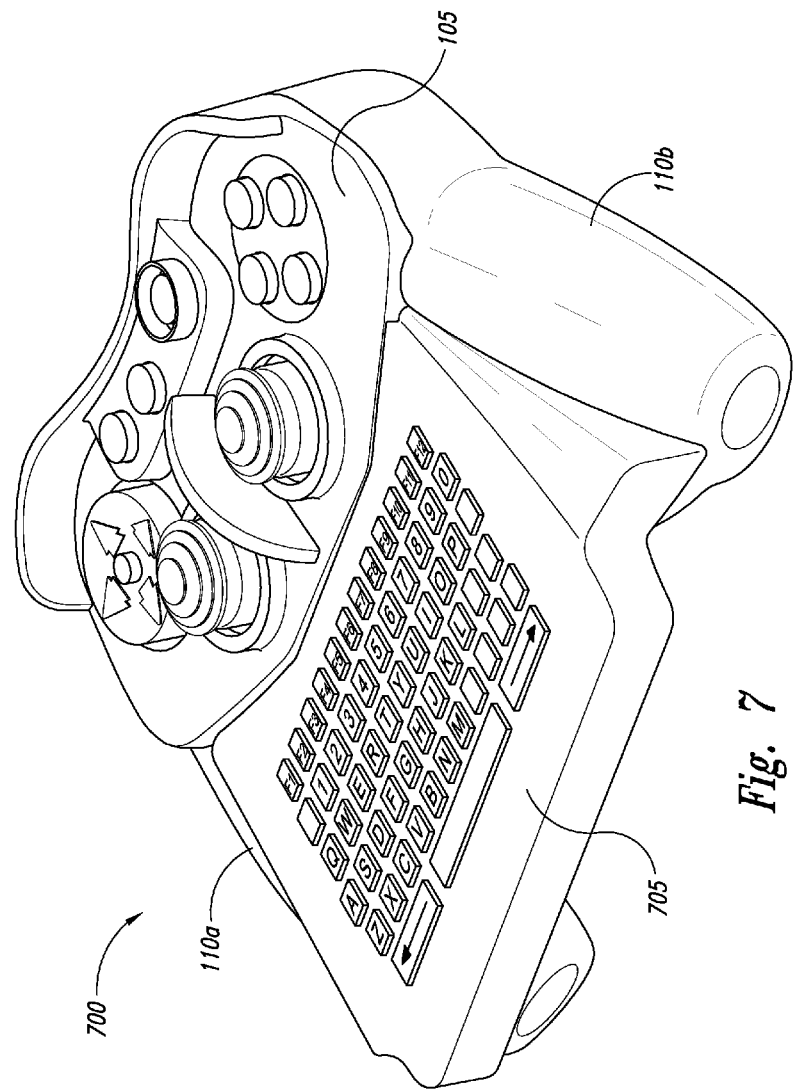
FIG. 7 is a side isometric view of an unmanned vehicle controller having a keyboard module.

FIG. 7 is a side isometric view of an unmanned vehicle controller 700 having a function bridge module comprising a keyboard module 705. The controller 700 includes many features similar to that of controllers 100, 200, and 300, depicted by FIGS. 1, 2, and 3, respectively. The controller 700 includes a keyboard module 705 attached to grip handles 110a and 110b. In some embodiments, the keyboard module 705 is mounted to the grip handles via one or more fasteners, such as screws, snaps, connectors, or other mechanisms. In other embodiments, the keyboard module 705 or a portion of the keyboard module 705 is integral to the grip handles 110a and 110b and/or the control area 105.

In some embodiments, the keyboard module 705 includes a 59-key QWERTY layout, including alphanumeric, function, and cursor control keys. Optionally, the keyboard module includes one or more NVIS-compatible illuminated keys. In some embodiments, the keyboard module 705 includes a text window that displays one or more lines of text that have been input using the keys. The keyboard module 705 can also include one or more pushbutton and/or toggle switches, Hall effect transducers, and/or other components. The keyboard module 705 or a portion of the keyboard module 705 can be transmitting data to the grip handles 110a and 110b and/or the control area 105 via various device interface mechanisms known in the art including, but not limited to, USB. In some embodiments, the controller 700 with the keyboard module 705 has a weight of 1 pound, 14 ounces, or approximately 1 pound, 14 ounces.

In some embodiments, the keyboard module 705 is removable, such as for replacement by another function bridge module. In some embodiments, the keyboard module 705 is detachable by removing or releasing the fasteners that attach the keyboard module 705 to the grip handles 110a and 110b and/or control area 105. In other embodiments, the keyboard module 705 slides in and out of a casing that engages with the keyboard module 705 and other function bridge modules. For example, an operator can slide the keyboard module 705 out of the casing, slide another function bridge module into the casing, and snap the new function bridge module securely into place.

Figure 9:
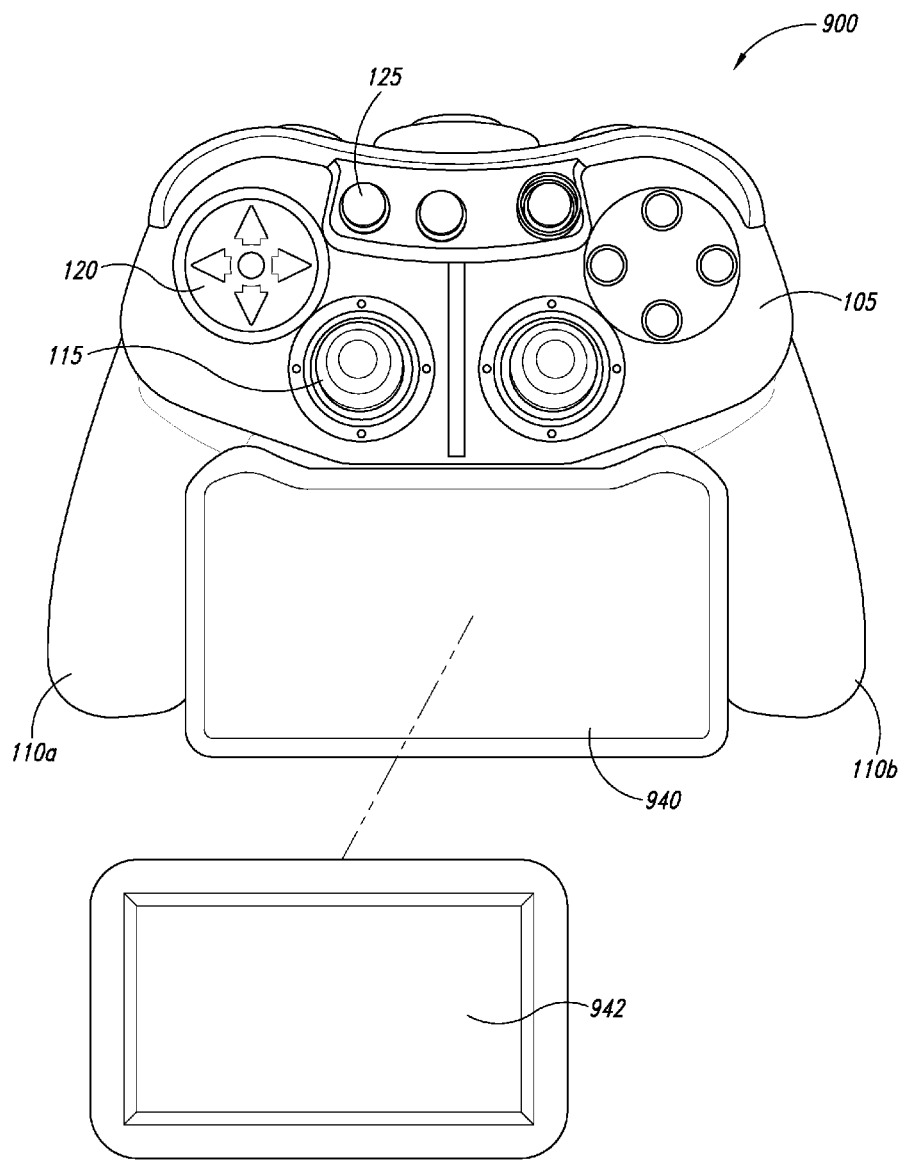
FIG. 9 is a top view of an unmanned vehicle controller having a display screen module that includes a tray portion and a cover portion.

FIG. 9 is a top view of an unmanned vehicle controller 900 having a function bridge module comprising a display screen module. The controller 900 includes many features similar to that of controllers 100, 200, and 300, depicted by FIGS. 1, 2, and 3, respectively. The controller 900 includes a display screen module 905 having a tray portion 940 and a cover portion 942. In some embodiments, the tray portion 940 is mounted to the grip handles 110a and 110b via one or more fasteners, such as screws, snaps, connectors, or other mechanisms. In some embodiments, the tray 940 is detachable by removing or releasing the fasteners that attach the tray 940 to the grip handles 110a and 110b and/or the control area 105. In other embodiments, the tray 940 slides in and out of a casing that engages with the tray 940 and other function bridge module trays. For example, an operator can slide the tray 940 out of the casing, slide another tray into the casing, and snap the second tray securely into place. In other embodiments, the tray portion 940 or a portion of the tray portion 940 can be integral to the grip handles 110a and 110b and/or the control area 105.

The cover portion 942 can be removeably mounted on the tray portion 940 such as for replacement by another module cover. In the illustrated embodiment, the cover portion 942 is in a detached configuration, ready for mounting on the tray portion 940. Other module covers 942 can include, but are not limited to, a pushbutton module cover or a keyboard module cover. In some embodiments the cover portion 942 is releaseably attached to the tray portion 940 via one or more fasteners, such as screws, snaps, connectors, or other mechanisms. In some embodiments, the cover 942 is detachable by removing or releasing the fasteners that attach the cover 942 to the tray 940. In other embodiments, the cover 942 slides in and out of a casing that engages with the cover 942 and other function bridge module covers. For example, an operator can slide the cover 942 out of the casing, slide another cover into the casing, and snap the second cover securely into place.

The cover portion 942 can include a screen and at least a portion of electrical components (not pictured) associated with the display screen module 905. In other embodiments, the cover 942 can include pushbuttons, a keyboard, or other user interfaces. The tray portion 940 and/or the cover portion 942 can be transmitting data to the grip handles 110a and 110b and/or the control area 105 via various device interface mechanisms known in the art including, but not limited to USB. In some embodiments, the controller 900 with the display screen module 905 has a weight of 1 pound, 14 ounces, or approximately 1 pound, 14 ounces.

From the foregoing, it will be appreciated that specific embodiments of the controllers have been described herein for purposes of illustration, but that various modifications may be made without deviating from the spirit and scope of the disclosure. For example, the function bridge modules can be mounted to and/or integrated with the controller in a variety of ways, while still retaining the grip balance, data utility, and system control. Accordingly, the disclosure is not limited except as by the appended claims.

We claim:

1. A vehicle control system for use with a remotely controlled vehicle, comprising:
   a controller comprising:
      a first grip handle, a second grip handle, and a control area adjacent to the first and second grip handle, wherein the first control area includes a plurality of controls operable to control at least a portion of the vehicle; and
      a visor attached to the control area and positioned adjacent to a first control in an arrangement configured to block unintended control activation;
      a plurality of switch guards coupled to the control area and positioned adjacent to at least second and third controls in an arrangement configured to block unintended control activation; and
      a function bridge display module removably attached to the first and second grip handles by a releasable fastener member, and wherein the function bridge display module extends between the first and second grip handles and is positioned away from the control area whereby a center of mass of the controller is disposed between the first and second grip handles and between a user's hands while gripping the first and second grip handles, and wherein the function bridge display module is within a field of view of one or more control areas, wherein the function bridge display module comprises a display screen operably coupled to the control area; and
      a function bridge keyboard module removably attachable to the first and second grip handles by the releasable fastener member, wherein the function bridge keyboard module is interchangeable with the function bridge display module, wherein the function bridge keyboard module comprises a plurality of keys positioned apart from the control area and between the first and second grip handles.

2. The vehicle control system of claim 1, further comprising a function bridge pushbutton module removably attachable to the first and second grip handles by the releasable fastener member, wherein the function bridge pushbutton module is interchangeable with the function bridge display module and the function bridge keyboard module for controlling at least portions of the vehicle.

3. The vehicle control system of claim 1 wherein at least one of the function bridge display module or the function bridge keyboard module comprises a tray portion and a cover portion removably attached to the tray portion.

4. The vehicle control system of claim 3 wherein:
   the tray portion is positioned between the first and second grip handles;
   the tray portion is attached to the first and second grip handles; and
   the cover portion is removably attached to the tray portion and supported between the first and second grip handles.

5. The vehicle control system of claim 1 wherein the grip handles include a casing configured to slideably engage with the function bridge module.

6. The vehicle control system of claim 1 wherein the function bridge module is configured to transmit data to at least one of the first and second grip handles or the control area via USB.

7. The vehicle control system of claim 1 wherein the function bridge display module has a viewing angle of approximately 180 degrees.

* * * * *